US012577332B2

(12) United States Patent
Leskinen et al.

(10) Patent No.: US 12,577,332 B2
(45) Date of Patent: Mar. 17, 2026

(54) PROCESS FOR PRODUCING ALPHA-OLEFIN POLYMERS IN A MULTISTAGE POLYMERIZATION PROCESS

(71) Applicant: Borealis AG, Vienna (AT)

(72) Inventors: Pauli Leskinen, Porvoo (FI); Erno Elovainio, Porvoo (FI); Jouni Kivelä, Porvoo (FI); Klaus Nyfors, Porvoo (FI)

(73) Assignee: BOREALIS GMBH, Vienna (AT)

( * ) Notice: Subject to any disclaimer, the term of this patent is extended or adjusted under 35 U.S.C. 154(b) by 906 days.

(21) Appl. No.: 17/790,600

(22) PCT Filed: Feb. 23, 2021

(86) PCT No.: PCT/EP2021/054379
§ 371 (c)(1),
(2) Date: Jul. 1, 2022

(87) PCT Pub. No.: WO2021/170552
PCT Pub. Date: Sep. 2, 2021

(65) Prior Publication Data
US 2023/0063000 A1 Mar. 2, 2023

(30) Foreign Application Priority Data

Feb. 24, 2020 (EP) ..................................... 20159078

(51) Int. Cl.
*C08F 110/06* (2006.01)
*C08F 2/00* (2006.01)
(Continued)

(52) U.S. Cl.
CPC ............ *C08F 110/06* (2013.01); *C08F 2/001* (2013.01); *C08F 2/01* (2013.01); *C08F 2/34* (2013.01); *C08L 23/16* (2013.01); *C08L 2207/02* (2013.01)

(58) Field of Classification Search
CPC .. C08F 2/001; C08F 2/34; C08F 6/005; C08F 2/007
(Continued)

(56) References Cited

U.S. PATENT DOCUMENTS

| | | | |
|---|---|---|---|
| 5,733,987 | A | 3/1998 | Covezzi et al. |
| 2012/0178887 | A1 | 7/2012 | Kokko |

FOREIGN PATENT DOCUMENTS

| | | |
|---|---|---|
| DE | 2020127097 A1 | 6/2020 |
| EP | 0431626 A1 | 6/1991 |

(Continued)

OTHER PUBLICATIONS

United Arab Emirates Search Report for Application No. P6001642/2022 Dated: Jul. 26, 2024.
(Continued)

*Primary Examiner* — Fred M Teskin
(74) *Attorney, Agent, or Firm* — Lippes Mathias LLP

(57) ABSTRACT

The present invention relates to a process for producing alpha-olefin polymers in a multistage polymerization process which includes at least two gas phase polymerization reactors, wherein unreacted gas withdrawn from the second gas phase polymerization reactor is compressed in a compressor and said compressed gas is fed via a conveying gas line into an outlet between a first outlet vessel downstream of the first gas phase polymerization reactor and said second gas phase polymerisation reactor. Such a process can alleviate problems of malfunction, disturbances or plugging of the transfer lines and enables higher productivity and considerable saving of energy and equipment cost. Moreover, the production of alpha-olefin polymers with varying and tailored properties is possible.

13 Claims, 2 Drawing Sheets

(51) Int. Cl.
  *C08F 2/01*        (2006.01)
  *C08F 2/34*        (2006.01)
  *C08L 23/16*       (2006.01)

(58) Field of Classification Search
  USPC ............................................................ 526/65
  See application file for complete search history.

(56)                    References Cited

FOREIGN PATENT DOCUMENTS

| | | | |
|---|---|---|---|
| EP | 0887379 | A1 | 12/1998 |
| IT | 2008058839 | A2 | 5/2008 |
| JP | 2008121028 | A | 5/2008 |
| JP | 2009545659 | A | 12/2009 |
| JP | 2010509475 | A | 3/2010 |
| JP | 2013508484 | A | 3/2013 |
| WO | 2011066892 | A1 | 6/2011 |

OTHER PUBLICATIONS

United Arab Eimrates Office Actions for Application No. P6001642/ 2022 Dated: Sep. 14, 2024.
International Search Report from application No. PCT/EP2021/ 054379 Dated Jun. 21, 2021.
Japanese Office Action for Application No. 2022-550767 Dated Oct. 10, 2023.

PROCESS FOR PRODUCING ALPHA-OLEFIN POLYMERS IN A MULTISTAGE POLYMERIZATION PROCESS

CROSS REFERENCE TO RELATED APPLICATIONS

This is a 371 of PCT Application No. PCT/EP2021/054379, filed Feb. 23, 2021, which claims the benefit of European Application No. 20159078.3, filed Feb. 24, 2020, the contents of which are incorporated herein in their entirety.

The present invention relates to a process for producing alpha-olefin polymers in a multistage polymerization process which includes at least two gas phase polymerization reactors.

Gas phase reactors are commonly used for the polymerization of alpha-olefins such as ethylene and propylene as they allow relative high flexibility in polymer design and the use of various catalyst systems. A common gas phase reactor variant is the fluidized bed reactor.

For alpha-olefin polymerization gas phase reactors, such as fluidized bed reactors, are typically employed with outlet vessels in order to remove the particulate polymer material which is either sent to the downstream processing units or to subsequent reactor(s), such as especially in propylene polymerization where two or more subsequent reactor stages are employed to produce propylene polymers of different properties for a wide range of applications.

The challenge in operating the product outlet vessel is to remove the produced polymer powder with minimum amount of entrained gas mixture coming from the fluidized bed reactor via the vessel outlet. An increased amount of gas(es) in the polymer powder results in waste flaring and also can cause quality problems of the resulting polymer powder.

A further problem resides in that the gas composition exiting one of the gas phase reactors or the carry-over of the reaction gas from a slurry reactor heavily influences the polymer properties produced in the subsequent downstream reactor. Thus the gas mixture entrained in the polymer particles must be carefully controlled.

Particularly, malfunction, disturbances or plugging of the transfer lines can occur involving shut down of the whole plant, which leads to enormous productivity losses and to the possible safety risks.

EP 2 330 135 A1 discloses a process of producing a polyolefin in two consecutive reactors in gas phase in the presence of an olefin polymerisation catalyst wherein a first reaction gas mixture together with the produced olefin polymer and the olefin polymerisation catalyst dispersed therein is withdrawn from the first polymerisation reactor to form a first product stream; said first product stream is directed into a outlet vessel to form a bed of polymer in said outlet vessel; a portion of said first reaction gas mixture from said outlet vessel is withdrawn and returned into the first polymerization reactor; the olefin polymer is withdrawn from said outlet vessel to form a second product stream; and the second product stream is directed into a second polymerization reactor, wherein said outlet vessel operates essentially at the same pressure as the pressure in said first reaction stage at the point from where said first product stream is withdrawn and the portion of the first reaction gas mixture is returned into the first polymerization stage to a point where the pressure is lower than in the outlet vessel.

Such a process may alleviate the above problems but still malfunction, disturbances or plugging of the transfer lines can occur and further improvements are desired.

SUMMARY OF THE INVENTION

It is the object of the invention to provide a process which is capable of producing multimodal olefin polymers with reduced process costs and high yield. Thus, it is the finding of the invention that alpha-olefin polymer compositions may be produced comprising at least two components having differing molecular weights and/or contents of comonomer. Further, the present invention provides a simple and economical process for transferring the polymer from one polymerisation reactor into another. Especially the present invention provides a process with a significantly lower investment cost and operating cost than prior art processes.

The present invention provides a process of producing an alpha-olefin polymer composition comprising at least one alpha-olefin polymer produced in at least two consecutive gas phase reactors in the presence of an olefin polymerisation catalyst comprising the steps of:

a) polymerising a first alpha-olefin polymer in a first gas phase polymerization reactor in the presence of an alpha-olefin polymerisation catalyst and a first reaction gas mixture to form a first alpha-olefin polymer and said first reaction gas mixture;

b) continuously or intermittently withdrawing said first reaction gas mixture together with said first alpha-olefin polymer comprising said alpha-olefin polymerisation catalyst dispersed therein from the first gas phase polymerisation reactor to form a first product stream;

c) directing said first product stream into a first outlet vessel to form a bed of alpha-olefin polymer in said first outlet vessel;

d) withdrawing a stream of said first reaction gas mixture from said first outlet vessel and returning it into said first gas phase polymerization reactor;

e) continuously or intermittently withdrawing said first alpha-olefin polymer from said outlet vessel to form a second product stream;

f) directing said second product stream into a second gas phase polymerization reactor and polymerising first alpha-olefin polymer in the presence of an alpha-olefin polymerisation catalyst and a second reaction gas mixture to form a second alpha-olefin polymer and said second reaction gas mixture;

g) continuously or intermittently withdrawing said second reaction gas mixture together with said second alpha-olefin polymer comprising said alpha-olefin polymerisation catalyst dispersed therein from the second gas phase polymerisation reactor to form a third product stream; and h) directing said third product stream into a second outlet vessel to form a bed of alpha-olefin polymer in said second outlet vessel;

wherein unreacted gas withdrawn from said second gas phase polymerization reactor is compressed in a compressor and said compressed gas is fed into an outlet between said first outlet vessel and said second gas phase polymerisation reactor.

The polymerization system may comprise at least one slurry, preferably loop reactor upstream to the first gas phase polymerization reactor and/or at least one further gas phase polymerization reactor downstream to the second gas phase polymerization reactor.

In any of said at least one further gas phase polymerization reactors unreacted gas may preferably be withdrawn, compressed in a compressor downstream of a respective reactor and said compressed gas may be fed to an outlet vessel of a gas phase polymerization reactor directly upstream to said at least one further gas phase polymerization reactor into the outlet between said outlet vessel and said at least one further gas phase polymerisation reactor. This processing may be established in one or more or all of the at least one further gas phase polymerisation reactor(s).

The second gas phase polymerization reactor may contain a second reaction gas mixture which differs in terms of at least one component from the composition of the first reaction gas mixture and a second gas which is different from the first reaction gas mixture may be introduced into any of the outlet vessels. At least a part of the second gas mixture may be introduced in liquid form.

Further preferred features of the invention are defined in the dependent claims.

DETAILED DESCRIPTION OF THE PRESENT INVENTION

Polymerization

Figure 1:
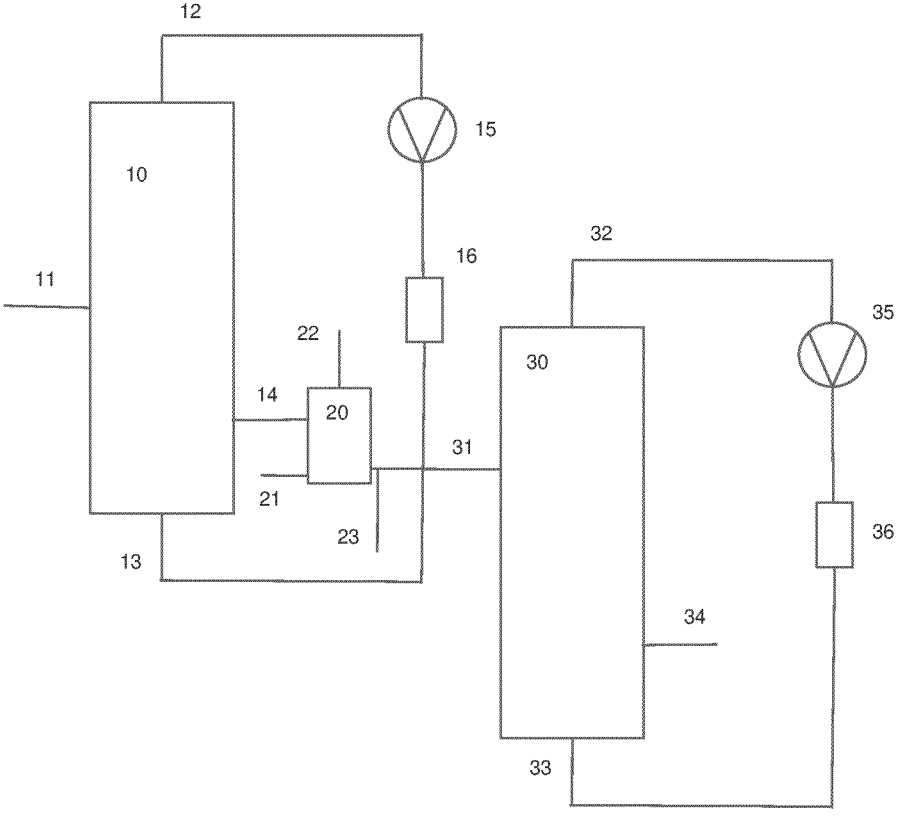
FIG. 1 is a diagram illustrating a basic setup of a process according to the invention.

The monomers polymerized in the process of the present invention are typically alpha-olefins having from 2 to 12 carbon atoms, preferably from 2 to 10 carbon atoms. Preferably, the olefins are ethylene or propylene, optionally together with one or more other alpha-olefins having from 2 to 8 carbon atoms. Especially preferably the process of the present invention is used for polymerizing ethylene, optionally with one or more comonomers selected from alpha-olefins having from 4 to 8 carbon atoms; or propylene, optionally together with one or more comonomers selected from ethylene and alpha-olefins having from 4 to 8 carbon atoms.

Thus, the polymer material is preferably selected from alpha-olefin homo- or copolymers having alpha-olefin monomer units of from 2 to 12 carbon atoms, preferably from 2 to 10 carbon atoms. Preferred are ethylene or propylene homo- or copolymers. The comonomer units of ethylene copolymers are preferably selected from one or more comonomers selected from alpha-olefins having from 4 to 8 carbon atoms. The comonomer units of propylene copolymers are preferably selected from one or more comonomers selected from ethylene and alpha-olefins having from 4 to 8 carbon atoms.

The polypropylene according to the present invention may have a density in the range 0.860-0.970 g/cm$^3$ and may preferably be selected from the group consisting of isotactic polypropylene with tacticity of at least 50%; random and heterophasic propylene copolymers; and blends of these polymers including other olefinic or non-olefinic polymers, where these other polymers may not exceed 40 wt. % of the total propylene polymer composition. The polypropylene can be e.g. a commercially available polymer or can be prepared according to or analogously to known polymerization process described in the chemical literature.

The polypropylene can be unimodal or multimodal with respect to one or more of molecular weight distribution, comonomer distribution or density distribution. A multimodal polyolefin may have at least two polymer components which have different weight average molecular weight, preferably a lower weight average molecular weight (LMW) and a higher weight average molecular weight (HMW). A unimodal polyolefin is typically prepared using a single stage polymerization, e.g. solution, slurry or gas phase polymerization, in a manner well-known in the art. A multimodal (e.g. bimodal) polypropylene can be produced by mechanically blending two or more, separately prepared polymer components or by in-situ blending in a multistage polymerization process during the preparation process of the polymer components. Both mechanical and in-situ blending are well-known in the field. A multistage polymerization process may preferably be carried out in a series of reactors, such as a loop reactor which may be a slurry reactor and/or one or more gas phase reactor(s). Preferably a loop reactor and at least one gas phase reactor is used. The polymerization may also be preceded by a pre-polymerization step.

Other examples of propylene polymers are: homopolypropylene, e.g. isotactic polypropylene; or propylene copolymers such as EPDM (ethylene copolymerized with propylene and a diene such as hexadiene, dicyclopentadiene, or ethylidene norbornene). The comonomers can be incorporated randomly or in block and/or graft structures.

According to the present invention, the olefin polymer may comprise or may be a heterophasic olefin copolymer, e.g. a heterophasic propylene copolymer. The heterophasic propylene copolymer may preferably be a heterophasic copolymer comprising a propylene random copolymer as matrix phase (RAHECO) or a heterophasic copolymer having a propylene homopolymer as matrix phase (HECO). A random copolymer is a copolymer where the comonomer part is randomly distributed in the polymer chains and it also consists of alternating sequences of two monomeric units of random length (including single molecules). It is preferred that the random propylene copolymer comprises at least one comonomer selected from the group consisting of ethylene and C$_4$-C$_8$ alpha-olefins. Preferred C$_4$-C$_8$ alpha-olefins are 1-butene, 1-pentene, 4-methyl-1-pentene, 1-hexene, 1-heptene or 1-octene, more preferred 1-butene. A particularly preferred random propylene copolymer may comprise or consist of propylene and ethylene. Furthermore, the comonomer content of the polypropylene matrix is preferably 0.5 to 10 wt %, more preferably 1 to 8 wt % and even more preferably 2 to 7 wt %. For combining optimum processability with the required mechanical properties, the incorporation of the comonomer can be controlled in such a way that one component of the polypropylene contains more comonomer than the other. Suitable polypropylenes are described e.g. in WO 03/002652.

Polymerization Catalyst

The polymerization in the gas-solids olefin polymerization reactor is conducted in the presence of an olefin polymerization catalyst. The catalyst may be any catalyst which is capable of producing the desired olefin polymer. Suitable catalysts are, among others, Ziegler—Natta catalysts based on a transition metal, such as titanium, zirconium and/or vanadium catalysts. Especially Ziegler—Natta catalysts are useful as they can produce olefin polymers within a wide range of molecular weight with a high productivity.

Suitable Ziegler—Natta catalysts preferably contain a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size of the silica support can be typically from 6 to 100 μm. However, it has turned out that special advantages can be obtained if the support has median particle size from 6 to 90 μm, preferably from 10 to 70 μm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another group of suitable Ziegler—Natta catalysts contain a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235.

Still a further type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510 of *Borealis*.

The Ziegler—Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, tri-hexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly used. If needed the activator may also include an external electron donor. Suitable electron donor compounds are disclosed in WO-A-95/32994, U.S. Pat. Nos. 4,107,414, 4,186,107, 4,226,963, 4,347,160, 4,382,019, 4,435,550, 4,465,782, 4,472,524, 4,473,660, 4,522,930, 4,530,912, 4,532,313, 4,560,671 and 4,657,882. Also electron donors consisting of organosilane compounds, containing Si—OCOR, Si—OR, and/or Si—NR$_2$ bonds, having silicon as the central atom, and R is an alkyl, alkenyl, aryl, arylalkyl or cycloalkyl with 1-20 carbon atoms are known in the art. Such compounds are described in U.S. Pat. Nos. 4,472,524, 4,522,930, 4,560, 671, 4,581,342, 4,657,882, EP-A-45976, EP-A-45977 and EP-A-1538167.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

Also metallocene catalysts may be used. Metallocene catalysts comprise a transition metal compound which contains a cyclopentadienyl, indenyl or fluorenyl ligand. Preferably the catalyst contains two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups or other heteroatom groups or the like. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

Prior Polymerization Stages

The polymerization in the first gas phase polymerization reactor may be preceded by prior polymerization stages, such as prepolymerization or another polymerization stage conducted in slurry or gas phase. A loop reactor is preferred as such a slurry phase reactor. Such polymerization stages, if present, can be conducted according to the procedures well known in the art. Suitable processes including polymerization and other process stages which could precede the polymerization process of the present invention are disclosed in WO-A-92/12182, WO-A-96/18662, EP-A-1415999, WO-A-98/58976, EP-A-887380, WO-A-98/58977, EP-A-1860125, GB-A-1580635, U.S. Pat. Nos. 4,582,816, 3,405,109, 3,324,093, EP-A-479186 and U.S. Pat. No. 5,391,654. As it is well understood by the person skilled in the art, the catalyst needs to remain active after the prior polymerization stages.

Gas Phase Alpha-Olefin Polymerization

In the gas phase alpha-olefin polymerization gaseous alpha-olefin monomers are introduced in a respective gas phase polymerization reactor in which the polymer particles are growing during polymerization.

The present process is suitable for any kind of gas-solids olefin polymerization reactors suitable for the polymerization of alpha-olefin homo- or copolymers as long as it comprises the use of at least two gas phase reactors. Suitable reactors are e.g. continuous-stirred tank reactors or fluidized bed reactors. Both types of gas-solids olefin polymerization reactors are well known in the art.

Preferably the gas-solids olefin polymerization reactor is a fluidized bed reactor.

In a fluidized bed reactor the polymerization takes place in a fluidized bed formed by the growing polymer particles in an upwards moving gas stream. In the fluidized bed the polymer particles, containing the active catalyst, come into contact with the reaction gases, such as monomer, comonomer(s) and hydrogen which cause polymer to be produced onto the particles.

A typical process according to the present invention is shown in FIG. 1 where alpha-olefin polymers are polymerised in two gas phase reactors, 10 and 30, preferably fluidized bed gas phase reactors. The catalyst, which may be dispersed within polymer particles from a prior polymerization stage, is introduced into the first gas phase reactor below the level of the fluidized bed but above the base of the fluidized bed via the conduit 11. The unreacted gas is collected from the top of the reactor via the conduit 12, compressed in a compressor 15 and cooled in a heat exchanger 16. The cooled and compressed gas is reintroduced into the reactor below the base of the fluidized bed via the conduit 13. The polymer, together with some accompanying gas, is withdrawn from the reactor via the conduit 14 and directed into a outlet vessel 20. Into the outlet vessel 20 gas is fed via the conduit 21. The gas flows upwards in the outlet vessel 20 and helps to remove the gas entering the outlet vessel 20 together with the polymer from the reactor 10 via the conduit 14. The gas is withdrawn from the outlet vessel 20 via the conduit 22 and may be returned into the reactor 10 or into the circulation gas line 12 before the compressor 15. The polymer, which now is in mixture with the gas entering from the conduit 21, leaves the outlet vessel 20 via the conduit 31. Via conduit 23 additional gas may be introduced to facilitate pneumatic transport of the polymer from the outlet vessel 20 to the reactor 30. The polymerisation is then continued in the reactor 30 in a similar fashion as was discussed above for reactor 10. The unreacted gas is collected from the top of the reactor 30 via the conduit 32, compressed in a compressor 35 and cooled in a heat exchanger 36. The cooled and compressed gas is reintroduced into the reactor 30 below the base of the fluidized bed via the conduit 33. If the process includes more than two polymerization stages then the present invention may be used in all the steps where the polymer is transferred from one gas phase polymerization stage to another.

The gas phase reactor may include a fluidization grid, or gas distribution plate, but preferably a gas phase reactor without such fluidization grid or gas distribution plate is used. Fluidized bed reactors without distribution plate are described in EP-A-2 495 037 and EP-A-2 495 038.

A fluidization gas may be withdrawn from the gas-solids polymerization reactor. By fluidization gas is meant the gas comprising monomer, and eventual comonomers, chain transfer agent and inert components which form the upwards flowing gas in the gas-solids olefin polymerization reactor and in which the polymer particles are suspended, e.g. in the fluidized bed of a fluidized bed reactor. The unreacted gas is collected at the top of the reactor, compressed, cooled and returned to the bottom of the reactor. Preferably, the gas is filtered before being passed to the compressor. As it is understood by the person skilled in the art the composition of the fluidization gas is not constant during the cycle. Reactive components are consumed in the reactor and they are added into the circulation line for compensating losses. Additional monomer, eventual comonomer(s), hydrogen and inert gas are suitably introduced into the circulation gas line. It is preferred to analyse the composition of the circulation gas, for instance, by using on-line gas chromatography and adjust the addition of the gas components so that their contents are maintained at desired levels.

Removal of Polymer Material

Polymer material is withdrawn from the gas-solids olefin polymerization reactor. Polymer material may also be discharged from the gas-solids olefin polymerization reactor from a suitable area, especially preferably from the middle zone of a fluidized bed reactor. In the following, a fluidized bed reactor is discussed. However, the process of the present invention may likewise be conducted in any other known type of gas phase polymerization reactor.

Figure 2:
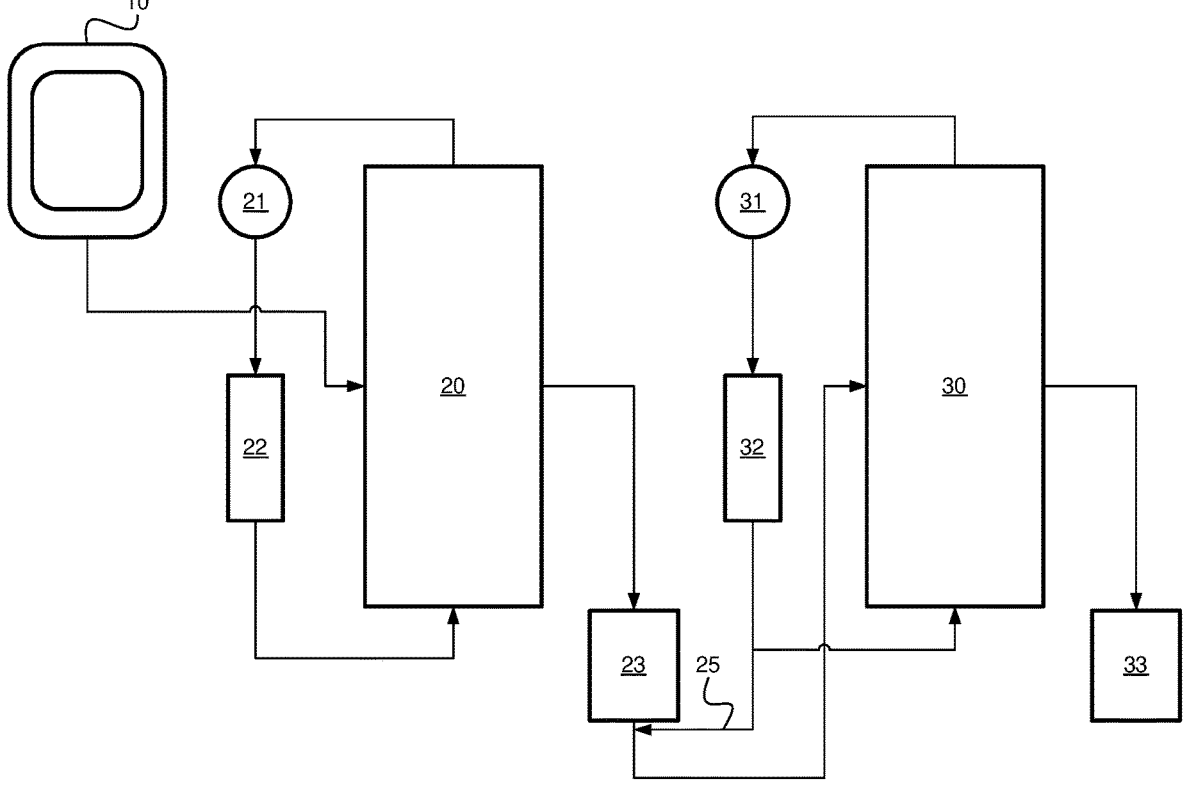
FIG. 2 is a diagram illustrating a basic setup of a process according to a preferred embodiment of the invention.

Such a preferred polymerisation system employing fluidized bed reactors is shown in FIG. 2 which is a preferred embodiment of the present invention. Accordingly, the present polymerization system comprises a first polymerization reactor (10), a second polymerization reactor (20), a third polymerization reactor (30). The term "polymerization reactor" shall indicate that the main polymerization takes place.

The first polymerization reactor (10) is preferably a slurry reactor and is more preferably a continuously operating loop reactor in bulk or slurry. Bulk means a polymerization in a reaction medium that comprises of at least 60% (w/w) monomer. According to the present invention, the slurry reactor is preferably a (bulk) loop reactor. The loop reactor (10) may be preceded upstream by a pre-polymerisation reactor into which monomer feed, catalyst, co-catalyst and donor feeds are fed. Further monomer feed, optionally comonomer feed and chain transfer agent (e.g. hydrogen) may be fed to the loop reactor (10) and any one or more than one of the gas phase reactors (20), and (30).

The polymerization reactors (20) and (30) are gas phase reactors (GPR). A gas phase reactor (GPR) according to this invention is preferably a fluidized bed reactor, a fast fluidized bed reactor or a settled bed reactor or any combination thereof. There may be one or more than one additional gas phase reactors present downstream of the second gas phase reactor (30), but these are not mandatory.

Each of the polymerization reactors (20) and (30) are connected to a respective outlet vessel (23) and (33) which are adjacent to the gas phase reactors (20) and (30). In case of fluidized bed reactors (20) and (30), a fluidized bed of catalytic particles is generated and maintained in the reaction zone on which particles further polymer material is formed due to the polymerization reaction. At the top of the gas phase reactors (20) and (30), unreacted gas leaves the reactors through a respective gas outlet at the upper end of the fluidized bed reactors. The gas can be separated from optional polymer particles in solids filter, repressurized in a compressor (21) and (31), respectively, cooled in a heat exchanger (22) and (32), respectively, and then recirculated to the respective gas phase reactor (20) and (30), respectively. A part of the polymer particles leaves the fluidized bed reactor through a polymer outlet of the respective reactor and is transferred to the top of the adjacent outlet vessel (23) and (33), respectively.

According to the present invention, unreacted gas withdrawn from said second gas phase polymerization reactor (30) is compressed in compressor (31) and said compressed gas is fed via a conveying gas line (25) into an outlet between said first outlet vessel (23) and said second gas phase polymerisation reactor (30). According to a preferred embodiment, such a conveying gas line may also transfer unreacted and compressed gas leaving an optional further gas phase reactor downstream of reactor (30) (not shown in FIG. 2) to an outlet between said second outlet vessel (33) and said optional further gas phase reactor.

The polymer material is withdrawn from a suitable area, preferably from the middle zone of the gas phase, preferably fluidization reactor, via a feed pipe into a respective outlet vessel, preferably through the top part of the outlet vessel. Thereby, the polymer material usually is discharged in form of polymer powder. The polymer powder can additionally comprise agglomerates.

Together with the polymer powder an entrained gas mixture is withdrawn from the gas phase reactor, e.g. fluidization reactor. "Entrained gas mixture" means the fluidization gas that is discharged together with polymer material from the gas-solids olefin polymerization reactor via the feed pipe into the outlet vessel. Depending on the polymerization process the entrained gas mixture can comprise monomer, comonomer, hydrogen, and inert gas such as propane, nitrogen.

In general, the polymer material can be withdrawn from the gas solid olefin polymerization reactor intermittently or continuously. It is preferred to withdraw the polymer material continuously.

One preferred way of establishing continuously discharge of polymer material or in other words continuous flow is by using a continuously operated control valve. The continuously operated control valve can be located in the feed pipe or in the return gas line connecting the outlet vessel and the gas phase reactor.

Flush gas may be used to enhance transport of the polymer material from the gas-solids olefin polymerization reactor to the outlet vessel.

The outlet vessel preferably has a main part, a bottom part and a top part. As a matter of definition, the main part is the part which has the highest effective diameter, whereas the bottom part is the part which has lower effective diameter than the main part. The top part merely is a closure of the outlet vessel.

A "barrier gas" may be introduced into the outlet vessel at the bottom part of the outlet vessel. The gas flows upwards in the outlet vessel through the discharged polymer material and helps to remove the entrained gas from the discharged polymer material. The barrier gas may be any gas which does not disturb the operation of the gas-solids olefin polymerization reactor. It may thus be an inert gas, such as propane or nitrogen, or, preferably, it may be the fluidization gas. When fluidization gas is used as the barrier gas, the barrier gas stream is then preferably taken from the circulation gas stream downstream of the cooler (heat exchanger) and upstream of the reactor inlet.

A further problem in gas-solids olefin polymerization exists because each rector defines a specific polymer composition for the production of a product or component with tailored properties. Therefore, the gas mixture in each reactor has to be carefully controlled. Leaking of the gas mixture from one reactor (e.g. GPR1) into another (e.g. GPR2) has to be carefully prevented or minimized because it would ruin the polymer composition in the subsequent reactor (e.g. GPR2). It is important that the forming polymer powder is subjected as fast as possible to the new polymerization conditions, when entering a downstream reactor (e.g. passing from GPR1 to GPR2). For example, if in the GPR1 a high stiffness matrix is produced and in the GPR2, downstream to GPR1, an elastomeric alpha-olefin copolymeric phase is produced, the gas composition in both reactors is completely different. The target is to exchange the gas composition from one reactor to the subsequent downstream reactor under controlled process conditions. The present invention solves this problem.

The process of the present invention involves the improvement that unreacted gas, e.g. fluidization gas as described above, is withdrawn from the second gas phase reactor, and optionally any further gas phase reactor downstream to the second gas phase reactor. Said unreacted gas is compressed in a compressor situated in the circulation line of the respective gas phase stage and the compressed gas is fed via a conveying line to an outlet of the outlet vessel connected to a gas phase reactor directly upstream to the gas phase reactor from which said unreacted gas is withdrawn. Preferably, this processing may be repeated in at least one further gas phase polymerization reactor downstream to said second gas phase polymerization reactor. This may be done in one or more than one or in all of these at least one further gas phase polymerization reactor(s). This processing has the effect to considerably save energy and equipment cost which would be necessary to flush or entrain polymer material situated in any of the outlet vessels and pass it on to a subsequent polymerization stage or to post-processing. In addition the inventive modification has the advantage that compressed gas is used as the conveying aid so that additional pressure build-up to increase the pressure required in the upstream outlet vessel is not needed. Finally, the inventive modification enables fast and controlled gas exchange between different gas phase reactors so that products may be produced in each reactor with substantially different and tailored properties.

The process of the present invention preferably further comprises the step of recovering unreacted gas from the top part of the outlet vessel and returning said gas to the gas-solids olefin polymerization reactor through return gas pipe. The return gas preferably comprises the entrained gas mixture in the polymer powder and the barrier gas. Optionally the return gas can further comprise flush gas which was used to enhance transport of the polymer material from the gas-solids olefin polymerization reactor to the outlet vessel.

Post-Reactor Treatment

When the polymer material has been recovered from the outlet vessel through the vessel outlet it can be subjected to process steps for removing residual hydrocarbons from the polymer material. Such processes are well known in the art and can include pressure reduction steps, purging steps, stripping steps, extraction steps and so on. Also combinations of different steps are possible.

In general, the polymer material can be recovered from the outlet vessel through the vessel outlet intermittently or continuously. It is preferred to recover the polymer material continuously.

According to one possible process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C.

According to another possible process the polymer powder is subjected to a pressure reduction as described above. Thereafter it is purged with an inert gas, such as nitrogen, over a period of from 20 minutes to 5 hours at a temperature of from 50 to 90° C. The inert gas may contain from 0.0001 to 5%, preferably from 0.001 to 1%, by weight of components for deactivating the catalyst contained in the polymer material, such as steam.

The purging steps are preferably conducted continuously in a settled moving bed. The polymer material moves downwards as a plug flow and the purge gas, which is introduced to the bottom of the bed, flows upwards.

Suitable processes for removing hydrocarbons from polymer material are disclosed in WO-A-02/088194, EP-A-683176, EP-A-372239, EP-A-47077 and GB-A-1272778.

After the optional removal of residual hydrocarbons the polymer material is preferably mixed with additives as it is well known in the art. Such additives include antioxidants, process stabilizers, neutralizers, lubricating agents, nucleating agents, pigments and so on.

The polymer particles are mixed with additives and extruded to pellets as it is known in the art. Preferably a counter-rotating twin screw extruder is used for the extrusion step. Such extruders are manufactured, for instance, by Kobe and Japan Steel Works. A suitable example of such extruders is disclosed in EP-A-1600276.

Examples

In all examples, process condition in the pre-polymerization reactor, in the loop reactor and in the first gas phase reactor (GPR1) were chosen to be very similar. On the other hand, the process conditions between the first and second gas phase reactor (GPR1 to GPR2) differed substantially. The purpose of the process was to produce a heterophasic polypropylene in GPR2. The matrix polymer was obtained in the pre-polymerization reactor, loop reactor and in the first gas phase reactor (GPR1). Production of an ethylene-propylene elastomeric polymer in the last reactor (GPR2) achieved the final heterophasic product. Exact process conditions in the individual polymerisation reactors and product properties are shown in Table 1 below.

TABLE 1

| Target | Comparative Example 1 | Comparative Example 2 | Inventive Example 1 | Inventive Example 2 | Inventive Example 3 |
|---|---|---|---|---|---|
| Prepol. reactor | | | | | |
| Temp. (° C.) | 20 | 20 | 20 | 20 | 20 |
| Press. (kPa) | 5226 | 5236 | 5304 | 5295 | 5264 |
| Catalyst feed (g/h) | 3.9 | 4.4 | 2.7 | 2.8 | 3.5 |
| C3 feed (kg/h) | 56 | 56 | 56 | 56 | 55 |
| H2 (g/h) | 0.4 | 0.4 | 0.4 | 0.4 | 0.4 |
| Loop reactor | | | | | |
| Temp. (° C.) | 73 | 70 | 80 | 79 | 75 |
| Press. (kPa) | 5307 | 5319 | 5380 | 5371 | 5333 |
| C3 feed (kg/h) | 177 | 178 | 179 | 179 | 178 |
| H2 feed (g/h) | 2.1 | 3.8 | 2.0 | 2.0 | 2.4 |
| Feed H2/C3 ratio (mol/kmol) | 0.25 | 0.45 | 0.23 | 0.23 | 0.28 |
| Solid Concentration (wt.-%) | 22.1 | 19.7 | 26.2 | 24.9 | 23.1 |
| Polymer Split (wt.-%) | 60 | 56 | 55 | 58 | 52 |
| MFR2 (g/10 min) | 98 | 52 | 81 | 80 | 77 |
| XS (%) | 0.6 | 0.7 | 0.8 | 0.8 | 0.8 |
| Fines (%) | 0 | 0 | 0 | 0 | 0 |
| APS (mm) | 1.1 | 1.2 | 1.2 | 1.3 | 1.3 |
| GPR1 | | | | | |
| Temp. (° C.) | 80 | 80 | 70 | 70 | 70 |
| Press. (kPa) | 2500 | 2355 | 2000 | 2000 | 2000 |
| C3 feed (kg/h) | 248 | 251 | 246 | 248 | 248 |
| H2 feed (g/h) | 9.0 | 12.0 | 9.0 | 10.6 | 17.1 |
| H2/C3 ratio (mol/kmol) | 1.1 | 1.4 | 1.4 | 1.6 | 1.7 |
| Polymer residence time (h) | 2.1 | 2.1 | 1.0 | 0.8 | 0.8 |
| Polymer Split (wt.-%) | 40 | 44 | 45 | 42 | 48 |
| MFR2 (g/10 min) | 62 | 55 | 38 | 43 | 52 |
| XS (%) | 0.6 | 0.9 | 0.8 | 0.4 | 0.5 |
| GPR2 | | | | | |
| Temp. (° C.) | 70 | 70 | 70 | 75 | 75 |
| Press. (kPa) | 2647 | 2647 | 2650 | 2650 | 2690 |
| C3 feed (kg/h) | 110 | 110 | 110 | 110 | 109 |
| H2 feed (g/h) | 0.0 | 0.0 | 0.0 | 1.8 | 8.5 |
| C2 feed (kg/h) | 15.9 | 15.7 | 23.6 | 21.7 | 42.3 |
| H2/C2 ratio (mol/kmol) | 0.0 | 0.0 | 0.02 | 0.28 | 0.85 |
| C2/C3 ratio (mol/kmol) | 600 | 610 | 620 | 620 | 1203 |
| Nitrogen as a conveying gas from GPR1 to GPR2 | YES | YES | NO | NO | NO |
| GPR2 gas as a conveying gas from GPR1 to GPR2 | NO | NO | YES | YES | YES |
| Nitrogen content (mol-%) INERT | 45 | 44 | 11 | 12 | 9 |
| C3 and C2 content (mol-%) | 55 | 56 | 89 | 88 | 91 |
| Polymer Split (wt.-%) + | 3 | 4 | 15 | 17 | 25 |
| Loop & GPR1 MFR2 (g/10 min) | 50 | 39 | 23 | 22 | 14 |

TABLE 1-continued

| Target | Comparative Example 1 | Comparative Example 2 | Inventive Example 1 | Inventive Example 2 | Inventive Example 3 |
|---|---|---|---|---|---|
| C2 (wt.-%) | 0.2 | 0.3 | 1.3 | 2.0 | 9.5 |
| Catalyst productivity (kg PP/gcat) | 9 | 8 | 17 | 18 | 16 |
| Mixer | | | | | |
| MFR2 (g/10 min) | 49 | 43 | 20 | 22 | 13 |
| XS (%) | 0.66 | 0.63 | 10.7 | 12.2 | 31.9 |
| Total C2 (wt.-%) | 0.20 | 0.40 | 1.4 | 2.2 | 9.1 |
| AM (%) | na | na | 8.8 | 9.9 | 31.5 |
| C2/AM | na | na | 24.5 | 23.0 | 37.2 |
| IV/XS (ml/g) | na | na | 495 | 475 | 312 |
| Pellet | | | | | |
| Amount (kg) | 400 | 400 | 300 | 400 | 400 |
| MFR2 (g/10 min) | 46.8 | 40.1 | 18.0 | 19.6 | 11.5 |

Operability was good when the circulation gas of the second gas phase reactor (GPR2) was used as a conveying gas to the outlet vessel of the first gas phase reactor (GPR1). No plugging and not any process disturbances were seen.

In the comparative examples, fresh nitrogen was used as a conveying gas, which did not originate from the GPR2, but was fed from an external source. The nitrogen concentration in GPR2 was high and therefore propylene concentration was low. This gas composition led to low catalyst productivity i.e. about 8-9 kg PP/g catalyst in GPR2.

In the inventive examples. propylene was used as the conveying gas from GPR2 to the outlet vessel of GPR1 which led to much higher propylene partial pressure in GPR2. Therefore, the catalyst productivity was much higher i.e. about 16-18 kg PP/g catalyst in GPR2.

Other responses like $H_2$ response remained the same. Higher productivity lead to higher ethylene content and xylene solubles (XS) which is desirable as higher rubber contents in the end product translates into higher impact properties of the heterophasic polypropylene composition.

The invention claimed is:

1. A process for producing an alpha-olefin polymer composition in a multistage polymerization process comprising at least two gas phase reactors, the process comprising the steps of:

a) polymerising a first alpha-olefin polymer in a first gas phase polymerization reactor in the presence of an alpha-olefin polymerisation catalyst and a first reaction gas mixture to form a first alpha-olefin polymer and said first reaction gas mixture;

b) continuously or intermittently withdrawing said first reaction gas mixture together with said first alpha-olefin polymer comprising said alpha-olefin polymerisation catalyst dispersed therein from the first gas phase polymerisation reactor to form a first product stream;

c) directing said first product stream into a first outlet vessel to form a bed of alpha-olefin polymer in said first outlet vessel;

d) withdrawing a stream of said first reaction gas mixture from said first outlet vessel and returning it into said first gas phase polymerization reactor;

e) continuously or intermittently withdrawing said first alpha-olefin polymer from said outlet vessel to form a second product stream;

f) directing said second product stream into a second gas phase polymerization reactor and polymerising said first alpha-olefin polymer in the presence of an alpha-olefin polymerisation catalyst and a second reaction gas mixture to form a second alpha-olefin polymer and said second reaction gas mixture;

g) continuously or intermittently withdrawing said second reaction gas mixture together with said second alpha-olefin polymer comprising said alpha-olefin polymerisation catalyst dispersed therein from the second gas phase polymerisation reactor to form a third product stream; and h) directing said third product stream into a second outlet vessel to form a bed of alpha-olefin polymer in said second outlet vessel;

characterized in that unreacted gas withdrawn from said second gas phase polymerization reactor is compressed in a compressor and said compressed gas is fed into an outlet between said first outlet vessel and said second gas phase polymerisation reactor.

2. The process according to claim 1, comprising at least one slurry reactor upstream to the first gas phase polymerization reactor.

3. The process according to claim 1, comprising at least one further gas phase polymerization reactor downstream to the second gas phase polymerization reactor.

4. The process according to claim 3, wherein unreacted gas withdrawn from said at least one further gas phase polymerization reactor is compressed in a compressor and said compressed gas is fed to the outlet vessel of the gas phase polymerization reactor directly upstream to said at least one further gas phase polymerization reactor into the outlet between said outlet vessel and said at least one further gas phase polymerisation reactor.

5. The process according to claim 1, wherein the pressure in an outlet vessel of a gas phase polymerization reactor is within 10% of the pressure in the polymerization stage at the point from where the respective product stream is withdrawn.

6. The process according to claim 1, wherein said stream of said first reaction gas mixture is withdrawn from above the level of said alpha-olefin polymer bed in said outlet vessel.

7. The process according to claim 1, wherein the alpha-olefin polymer forms a settled downward moving bed of alpha-olefin polymer in said outlet vessel(s).

8. The process according to claim 1, wherein said second gas phase polymerization reactor contains a second reaction gas mixture which differs in terms of at least one component from the composition of said first reaction gas mixture and a second gas which is different from said first reaction gas mixture is introduced into any of said outlet vessels.

9. The process according to claim 8, wherein at least a part of said second gas is introduced in liquid form.

10. The process according to claim 8, wherein said second gas has the same composition as said second gas mixture.

11. The process according claim 1, wherein said at least one alpha-olefin monomer is selected from the group consisting of ethylene, propylene, 1-butene, 1-hexene, 4-methyl-1-pentene, 1-octene, 1-decene, and mixtures thereof.

12. The process according to claim 2, wherein the at least one slurry reactor is a loop reactor.

13. The process according to claim 1, wherein the compressed gas passes through a heat exchanger before being fed into the outlet between said first outlet vessel and said second gas phase polymerisation reactor.

\* \* \* \* \*